H. POPE.
LEVER DEVICE FOR COUPLING HOSE AND FOR OTHER PURPOSES CONNECTED WITH WATER SYSTEMS.
APPLICATION FILED JAN. 24, 1917.
1,225,271. Patented May 8, 1917.
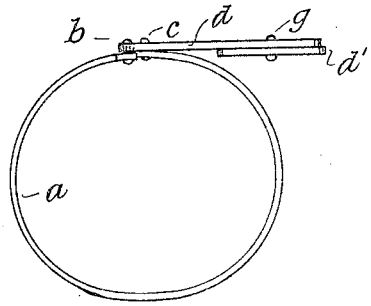
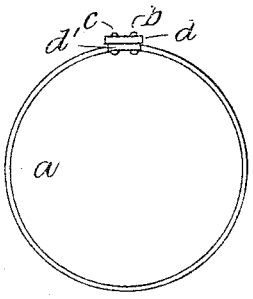
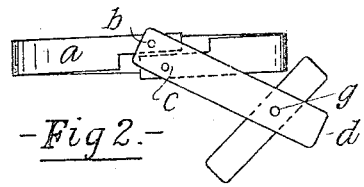
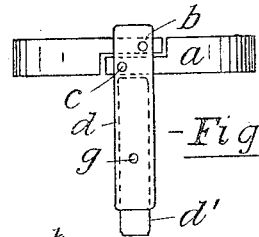
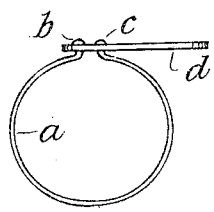
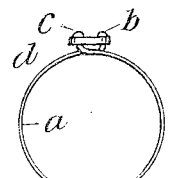
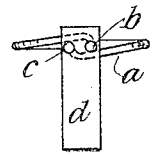
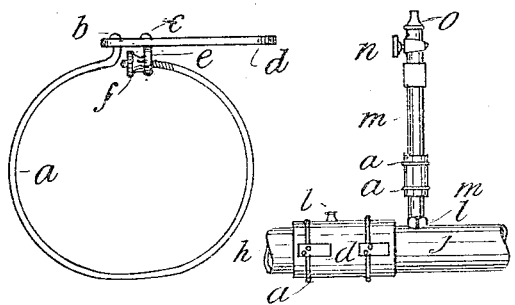
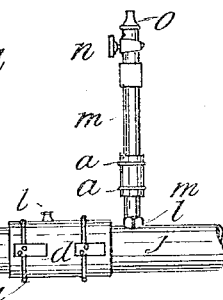
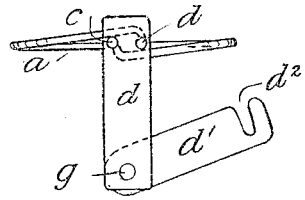
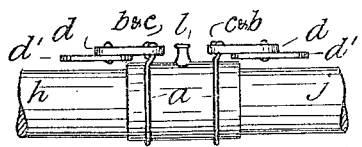
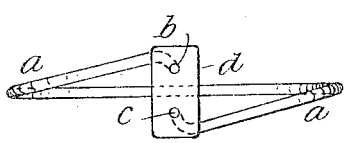

UNITED STATES PATENT OFFICE.

HENRY POPE, OF NORTH ADELAIDE, SOUTH AUSTRALIA, AUSTRALIA.

LEVER DEVICE FOR COUPLING HOSE AND FOR OTHER PURPOSES CONNECTED WITH WATER SYSTEMS.

1,225,271. Specification of Letters Patent. Patented May 8, 1917.

Application filed January 24, 1917. Serial No. 144,292.

*To all whom it may concern:*

Be it known that I, HENRY POPE, citizen of the Commonwealth of Australia, residing at the corner of Barton Terrace and O'Connell street, North Adelaide, in the State of South Australia, Commonwealth of Australia, orchardist, have invented certain new and useful Improvements in Lever Devices for Coupling Hose and for other Purposes Connected with Water Systems, of which the following is a specification.

My invention relates to an improved lever device for coupling hose and for other purposes connected with water systems the object of the same being to provide a simple and inexpensive quickly connectible system for water distribution and irrigation comprising a series of pipes and ferrules, and fastening bands of metal having ends so disposed that by aid of a lever they are caused to overlap each other and remain in a self-locked position, a supplemental lock being added if so desired.

In order that my invention may be clearly understood I will now describe the same by aid of the accompanying illustrative drawings wherein—

Figures 1 and 3 are side elevations of a band coupling respectively in locked and unlocked positions.

Figs. 2 and 4 are plans of the above.

Figs. 5 and 6 side elevations of wire couplings locked and unlocked respectively.

Fig. 7 plan of Fig. 6.

Fig. 8 side elevation of a wire coupling with adjustment screw.

Fig. 9 plan of wire coupling with safety locking lever.

Fig. 10 plan of wire coupling with link attachment for a separable lever or key.

Figs. 11 and 12 are illustrations showing the general arrangement for water distribution and irrigation.

In each of the drawings similar letters of reference are used to denote similar or corresponding parts.

Throughout the drawings *a* represents the body portion of the coupling which may be of metal band formation as in Figs. 1 to 4 or it may be a wire structure as in the remaining figures.

These couplings are designed with the object of enabling a band or ferrule of suitable material such as rubber or fabric when placed around adjacent ends of pipe or hose as in Figs. 11 and 12 to be firmly held in position.

It may be mentioned that if lengths of canvas or rubber hose are to be joined or hose of other pliant material a metal ring or ferrule is fitted snugly into the interior of the hose to give rigidity thereto and to form a foundation for the coupling. This interior ferrule is not shown in the drawings.

At each end of the body portion of the coupling I provide upwardly turned ends or fulcrums such as *b* and *c* which may consist either of short projecting rivets when applied to the band construction as in Figs. 1 to 4 or may be formed by up-turning the ends of wire as in Figs. 5 to 10 (excluding the modification shown in Fig. 8 hereinafter described).

In either form of arrangement the total length of the band is in excess of the circumference of the pipe to which it is to be applied but by taking advantage of the excessive length and over-lapping the ends as hereinafter explained the effective diameter is reduced so as to cause a tight fit around the pipe.

In the band construction the ends are cut away as clearly indicated in Figs. 2 and 4 and the fulcrums *b* and *c* are placed on opposite sides of the circumferential center line.

In the wire structure the same arrangement is obtained by slightly bending the adjacent up-turned ends of the wire inwardly as clearly shown in Figs. 7, 9 and 10.

The up-turned ends or fulcrums are joined together by a short lever *d* which is capable of straining the body part by the rotary motion of the lever to a reduced effective diameter and during such rotary motion of the lever the fulcrums are caused to pass each other the band being thrown slightly out of alinement during the passage as in Fig. 10 until the middle position has been passed whereupon the strain is so disposed that the device becomes self-locking as will be better understood on reference to Fig. 7 of the drawings.

It will not be always convenient to form a ring portion of the exact diameter required to obtain the desired effect, but provision is made for this contingency as shown in Fig. 8 wherein one end of the wire is turned up while the equivalent of the fulcrum is obtained by means of a rotatable rivet such as

*e* in Fig. 8 having its lower end formed as an eyelet through which the wire is passed, such end of the wire being screw-threaded at its extremity and furnished with an adjustment nut *f* whereby a very delicate adjustment of the effective circumference of the wire can be obtained.

As a further means of safety the lever may be furnished with an extension $d^1$ which is pivoted to the lever *d* by means of a small rivet *g* so that its end may be caused to abut against the edge of the loop when made as a band as in Fig. 4 or its end may be slotted as at $d^2$ in Fig. 9 so that the slotted portion may engage and further lock one or both of the up-turned portions of the wire.

In Fig. 10 I have illustrated a short length for connecting the two ends of the device such link being capable of locking action when turned by a detachable key or lever.

The general arrangement of the parts will be easily understood from reference to Fig. 11 wherein *h* and *j* represent adjacent pipe ends and *k* is an outer ferrule or band of rubber or fabric which is held in position by my invention as set forth in the preceding descriptive matter. In this figure as well as in Fig. 12 I have shown a socket $l^1$ for connecting purposes in combination with the ferrule, the construction preferably consisting of a hole formed near the center of the ferrule, the opening being provided with a faucet shoulder which is held by an internal clamping nut.

The faucet may be of any suitable design to act as a distributing agent, and can be provided with a screw thread and plug or cap for blocking the orifice. Substantially the same kind of arrangement is illustrated in Fig. 12, except that the opening *l* is formed on the adjacent length of light sheet iron piping, and carries a branch pipe or standard as *m* with or without an intermediate flexible ferrule, and can be fitted with a stopcock *n* and an ordinary outlet or spray *o* as illustrated.

What I claim as new and desire to secure by Letters Patent is:—

1. A device of the character described, comprising a flexible band having its opposite ends reduced in width and overlapped, projections at each end of the band at opposite sides of its center line, and a lever having at one end thereof oppositely disposed perforations through which said projections pass, whereby said projections serve as a fulcrum for said lever during turning of the latter to tighten said band about an object.

2. A device of the character described, comprising a flexible band having its opposite ends reduced in width and overlapped, projections at each end of the band at opposite sides of its center line, a lever having at one end thereof oppositely disposed perforations through which said projections pass, whereby said projections are adapted to serve as a fulcrum for said lever, and a locking plate pivoted adjacent the opposite end of said lever and adapted to be moved into engagement with said band.

In testimony whereof I affix my signature in presence of two witnesses.

HENRY POPE.

Witnesses:
  JOHN HERBERT COOKE,
  KATHLEEN CONSTANCE YEAKES.

Copies of this patent may be obtained for five cents each, by addressing the "Commissioner of Patents, Washington, D. C."